Patented Nov. 2, 1948

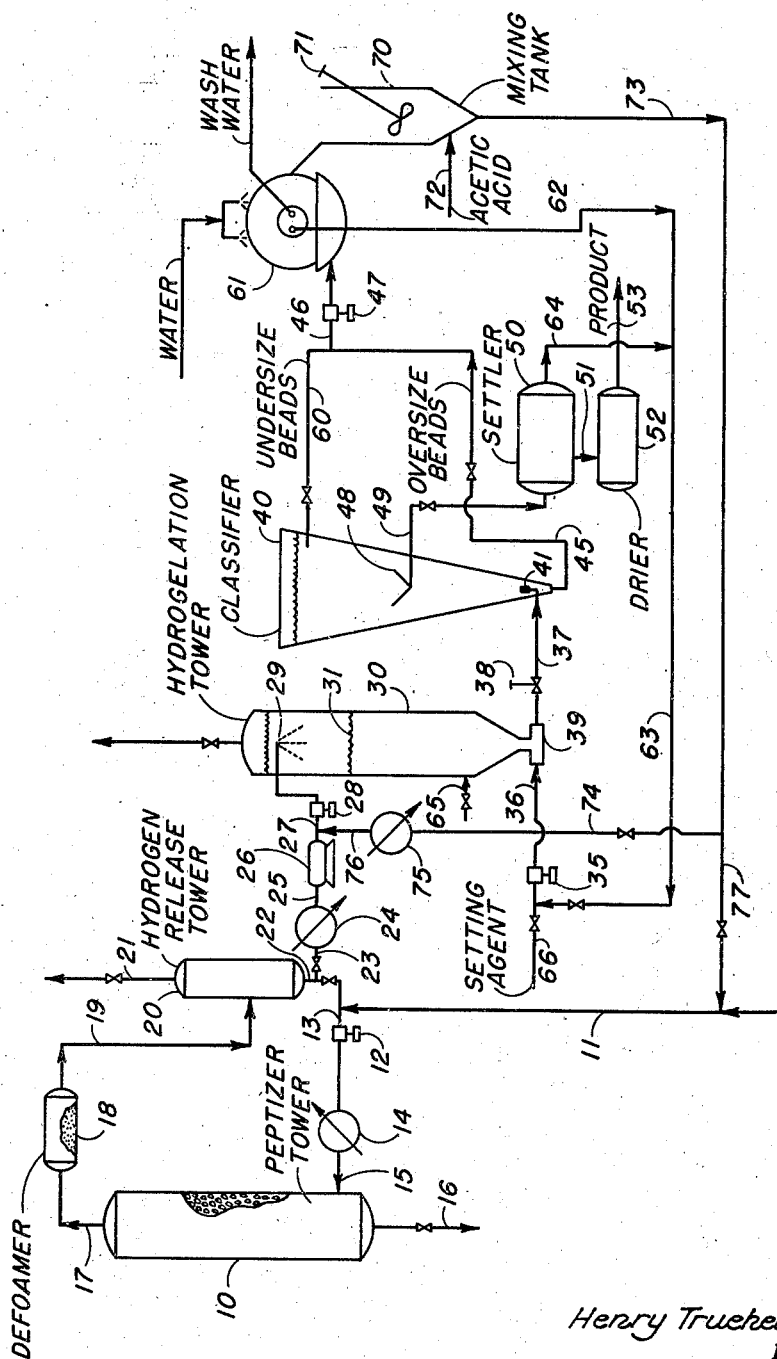

2,453,084

UNITED STATES PATENT OFFICE 2,453,084

MANUFACTURE OF BEAD-FORM CATALYST

Henry Trueheart Brown, Dallas, Tex., assignor, by mesne assignments, to Socony-Vacuum Oil Company, Incorporated, New York, N. Y., a corporation of New York Application May 24, 1946, Serial No. 671,975

7 Claims. (Cl. 252—259.2)

1

This invention relates to the preparation of bead-form, adsorptive and catalytic masses from inorganic oxides, and is particularly concerned with a continuous process for the manufacture of bead-form catalyst particles of relatively uniform size. In a more limited sense this invention is concerned with the classification of hydrogel particles of alumina of various sizes to obtain therefrom particles of hydrogel which when dried will be beadlike in form, uniform in size, and suitable for use as adsorbent material, and/or suitable for use as catalytic material for hydrocarbon conversion processes following further heat treatment to activate the gel particles.

It is known in the art to coagulate a stable alumina sol with an electrolyte such as ammonium hydroxide to produce a gel which, when dried and activated by heat treatment, is a catalyst for hydrocarbon conversion processes. Such a catalyst is described in U. S. Reissue Patent 22,196. It is also known that cogels of metastable hydrosols comprising various oxides such as mixtures of alumina and silica may be prepared in beadlike form. The hydrosol is caused to set to the corresponding hydrogel in spheroidal form assumed under the influence of surface tension against a fluid medium which is not miscible with the hydrosol. Such spheroidal cogels are described in U. S. Patent 2,384,946. It has been found that beadlike hydrogel particles of alumina can be formed by injecting stable alumina hydrosol into a body of a fluid medium which is not miscible with the hydrosol to form spheroidal droplets of hydrosol. The spheroidal particles flow by gravity through the immiscible fluid to an aqueous solution of an electrolyte, such as a weak solution of ammonia, in which the hydrosol sets to alumina hydrogel.

In the use of alumina gel beads it is highly desirable to employ particles of relatively uniform size. One method consists of washing and drying the hydrogel beads and then screening the beads to obtain the desired size. This method involves additional handling of the beads, undesirable attrition losses, and losses by breaking, thus increasing the cost of manufacture. It is an object of this invention to provide a means of separating hydrogel beads of any desired size from hydrogel beads which are oversize and/or undersize. Another object of the invention is to recover offsize hydrogel beads immediately after being formed whereby the offsize beads may be recycled to the sol-producing step. Other objects of the invention will appear hereinafter.

In one embodiment of the invention, which is illustrated diagrammatically in the drawing described in detail hereinbelow, amalgamated aluminum metal is continuously peptized by means of a 1 per cent to about 5 per cent aqueous solution of acetic acid to form alumina hydrosol. Peptization of the aluminum may be accomplished at a temperature within the range of from about 150° to about 200° F. and at a pressure sufficient to prevent appreciable vaporization of the acetic acid solution. The peptizing liquid is continuously circulated in contact with the aluminum metal to build up a concentration of alumina hydrosol containing from 4 to 8 per cent of alumina. The resulting hydrosol is then cooled to a temperature below about 80° F. and passed to the hydrogelation step of the process.

The hydrogelation process consists of injecting a stream of the hydrosol into an immiscible liquid medium, such as a light, liquid petroleum fraction, with sufficient force to cause the stream to break up into a shower of droplets. These droplets of sol assume spheroidal shapes by reason of the high interfacial tension between the sol and the medium. If the sol is stable, the droplets set to hydrogel beads by the action of an underlying aqueous setting agent. If the sol is metastable, the beads set during the time of passage through the medium, i. e., the oil layer.

In the case of stable alumina sols it is apparent that the only function of the sol-immiscible layer is to provide a medium having the correct physical properties in which the stream of sol is converted into spheroidal droplets before passing into the aqueous setting medium. It is desirable to regulate the density of the oil layer with respect to the density of the sol so that the beads will pass rapidly into the aqueous setting agent but not so rapidly as to cause distortion when passing through the interface between the oil layer and the aqueous setting medium. The rate of fall may be controlled by regulating the viscosity of the oil layer. Incipient setting of the beads above the interface, i. e., in the oil layer, is highly desirable and such incipient setting will take place if a small amount of the setting agent diffuses from the lower or setting medium into the upper or bead-forming medium.

In the case of a metastable sol, such as silica-alumina hydrosol, the chief function of the sol immiscible oil layer is to provide a medium in which the sol may set to a firm hydrogel while in the form of spheroidal droplets. Generally, a greater depth of oil is desirable in this case than is necessary where the only function of the oil layer is to cause the formation of spheroidal particles. The time of passage may also be controlled by regulating the density and/or viscosity of the oil. The sol-immiscible medium should have such chemical composition as to not substantially decrease the surface tension in the droplets, thus permitting distortion before setting takes place.

A relatively high boiling kerosene, mineral seal oil, or a light gas oil is suitable for use as the hydrosol-immiscible liquid. If desired, other oil miscible liquids of higher specific gravity, such as carbon tetrachloride, may be mixed with the hydrocarbons to raise the specific gravity of the hydrosol-immiscible liquid. The oil is superimposed on a body of liquid setting agent consisting of an aqueous solution of a suitable electrolyte, such as a weak solution of ammonia. For example, when preparing unpromoted alumina catalyst, the stable hydrosol may be converted to the hydrogel in this bottom liquid layer by the use of an ammonium hydroxide solution having a pH of from about 6.5 to 8.0., preferably about 7.3. The pH of the ammonium hydroxide solution affects the rate of gelation. In general, I prefer to use relatively rapid gelation rates in order that definitely formed beads of hydrogel will form in the time required for descent of the particles through the layer of setting agent.

If a promoted alumina catalyst is desired, an aqueous solution of an ammonium salt of the acid corresponding to the activating oxide may be used in the aqueous setting layer in the tower. For example, an aqueous solution of ammonium metavanadate may be used if it is desired to produce a vanadium oxide-activated alumina bead catalyst. Ammonium chromate and ammonium molybdate solutions may be used to prepare chromic oxide and molybdic oxide-activated alumina bead catalyst. On the other hand, an aqueous solution of these ammonium salts may be incorporated in the sol by rapid mixing therewith immediately preceding the time of injection of the sol into the oil layer in which type operation a separate aqueous setting agent is not required.

The size of the globules of hydrosol formed in the oil is controlled by the rate at which the hydrosol flows through the orifice of the injection nozzle, on the dimensions of the nozzle and on the viscosity of the oil. The relative densities of the hydrosol and of the immiscible liquid, i. e., the oil, also affect the size of the particles. Thus, if the differential density is small the size of the spheroidal particles will tend to be large. The use of more dense, concentrated hydrosols tends to increase the differential density resulting in the formation of smaller beads. In any case, the hydrogel particles formed from the hydrosol are generally of unequal size and it is highly desirable to classify the hydrogel particles from the hydrogelation step before drying in order to recover for final processing only the desired size particles. The offsize hydrogel particles may be reconverted to hydrosol and the hydrosol thus obtained may be recycled to the droplet-forming step.

The classification of the hydrogel spheres is accomplished by introducing a liquid suspension of the spheres at or near the bottom of a classifier tower. The cross sectional area of horizontal sections of the tower progressively increases at levels above the level of introduction of the liquid suspension. This tower may be shaped like an inverted cone. At the point of introduction of the liquid suspension the cross sectional area of a horizontal section of the tower is greater than the cross sectional area of the stream and there is an initial decrease of the linear velocity of the stream as it enters the body of liquid in the classifier.

As the liquid rises in the classifier the velocity progressively decreases as a result of the increased cross sectional area of the tower. As a result of the initial decrease in velocity the oversize particles tend to settle first and may be separately drawn off as a slurry from the bottom of the tower. Further decrease in the velocity of the stream as the liquid rises in the tower permits the settling and stratification of the particles of the desired size range which may also be separately drawn off as a slurry from the main body of the stream. The overflow from the top of the tower may be made to carry in suspension the undersize particles from the tower.

The streams of oversize and the undersize particles may be combined and filtered, and the hydrogel particles so recovered may be washed. If the hydrogel particles consist of alumina hydrogel, the washed, offsize hydrogel spheroidal particles may be crushed and slurried with an aqueous solution of a low molecular weight organic acid, such as acetic acid solution to repeptize the hydrogel to the hydrosol. If repeptization of the alumina hydrogel is incomplete, the stream of suspended hydrogel may be recycled to the peptizer tower to furnish make-up acetic acid. If repeptization is complete, the resulting hydrosol may be recycled to the hydrogelation step. The concentration of the acetic acid solution used for repeptizing the hydrogel is preferably within the range of from about 3 to 5 weight per cent and may be as high as 10 weight per cent.

If the particles consist of silica hydrogel or silica-alumina hydrogel, the crushed and slurried offsize hydrogel may be reconverted to the hydrosol by dissolving the hydrogel in an aqueous solution of an alkali, which can then be acidified to form the hydrosol. The hydrosol may be recycled to the droplet-forming step.

The liquid suspension of intermediate size hydrogel spheres is passed to a settler and then, if desired, to a washing step. The spheroidal particles are then passed to a drier where the beads are dried at a temperature of from about 175° F. to 200° F. If the dried beads are to be used as a catalyst they are heat-treated at a temperature of from about 800° F. to about 950° F. to activate the alumina gel beads and to decompose and remove therefrom the ammonium salt of the acid used as the peptizing agent.

The degree of separation and the range of particle size in the fractions segregated at different levels in the classifier will depend on the distribution of particle size in the suspension, on the linear velocity of the stream at the point of introduction to the classifier tower, and on the differential linear velocity of the stream in the tower as affected by the angle of the cone. Thus, if it is desired to remove only the finest particles and extremely oversize particles as separate fractions, an inverted cone-shaped chamber having a relatively large acute angle and a large diameter base should be used. On the other hand, if it is desired to fractionate the hydrogel particles into a multiplicity of intermediate sizes, an inverted cone-shaped chamber whose sides are more nearly vertical should be used. If desired, the upper part of the classifier may be constructed with a progressively decreasing cross sectional area at the level above the zone of segregation of the intermediate size hydrogel particles thereby producing higher stream velocities in the upper section of the classifier and facilitating removal of the undersize particles. It will be obvious to those skilled in the art that the clasification of the hydrogel particles having different diameters will take place as a result of an equilibrium or balance between their several terminal velocities as calculated from Stokes' law and the progressively decreasing velocity of the suspending liquid resulting from the shape of the tower.

The invention may be better understood by reference to the drawing wherein the preparation of alumina beads is diagrammatically illustrated and described. Referring now to the figure, peptizer tower 10 is loosely packed with amalgamated aluminum metal of relatively high purity, preferably containing not more than 0.10 per cent copper. The packing in tower 10 may be disposed therein as a continuous bed or the aluminum metal may be contained in a series of separate trays. A dilute acetic acid solution from line 11 is passed by means of pump 12 in line 13 to heater 14 where the solution is raised to a temperature somewhat above 150° F., preferably to about 175° F. The hot solution passes from heater 14 through line 15 and is introduced to tower 10 at a point somewhat above the bottom of the tower. As a solution passes upward through tower 10 in contact with the amalgamated aluminum a hydrosol of alumina is formed. Aluminum is consumed and hydrogen is formed. Metallic mercury, freed from the amalgated metal, is withdrawn intermittently from tower 10 through line 16. A part of the mercury in a finely divided state is usually carried along in suspension in the solution which passes overhead through line 17 to defoamer 18. Finely divided particles of aluminum metal may also be suspended in the liquid as it enters defoamer 18.

When amalgamated aluminum is treated with an organic acid such as acetic acid, a large amount of foaming of the liquid takes place as a result of the production of hydrogen in the mixture. This is particularly true as the viscosity of the liquid increases with increased concentration of the hydrosol. Defoamer 18 is provided to break up the foam in the liquid and consists of a vessel packed with a material which will furnish a large surface area such as glass wool or other suitable material inert to the acidic hydrosol. The defoamer may also be provided with such inert material arranged as a filter medium to remove small suspended particles of aluminum and mercury from the circulating liquid. The liquid product passes from defoamer 18 through line 19 to hydrogen release tower 20 whence hydrogen is vented from the liquid in tower 20 through line 21. The liquid product passes from tower 20 through line 22 which connects with line 13 and the acidic liquid is recirculated through tower 10 to increase the concentration of alumina hydrosol to within the range of from about 4 per cent to about 8 per cent by weight of alumina as described hereinabove. When the concentration of hydrosol in line 22 is sufficiently high a part of the hydrosol is withdrawn therefrom through line 23 which leads to cooler 24 wherein the temperature of the hydrosol is lowered to a temperature below about 80° F. The hydrosol passes from cooler 24 through line 25 to centrifuge 26 for the separation of the last traces of suspended metallic aluminum and mercury. From centrifuge 26 the clarified hydrosol is passed through line 27 by means of pump 28 to spray nozzle 29 which is immersed in the upper liquid layer, that is, the oil layer in hydrogelation tower 30.

Hydrogelation tower 30 contains two bodies of liquid consisting of a liquid having a specific gravity somewhat less than 1.00 with which the hydrosol is immiscible superimposed on a liquid setting medium or hydrogelation medium consisting of a solution of ammonia in water or in an alcohol-water solution. The specific gravities of the two bodies of liquids may be made more nearly equal by raising the gravity of the supernatant predominantly oil phase and/or by lowering the specific gravity of the hydrogelation medium. It is necessary that the density of the hydrosol be sufficiently greater than the density of the gelation medium to minimize the hindrance to passage of the hydrosol particles through the interface between the two liquid media. Reduction of interfacial tension between the two liquid media in tower 30 also facilitates the passage of the hydrosol particles through the interface. Hence, a proper choice of "blending" liquid either for the oil in the supernatant layer or for the predominantly aqueous lower layer is desirable. Carbon tetrachloride is a suitable "blending" liquid for the hydrocarbon oil layer. The use of ethyl alcohol as a "blending" liquid for the aqueous layer is taught and claimed in the copending application entitled "Hydrogelation process," Serial Number 750,171, filed May 23, 1947.

An aqueous solution of ammonia is introduced to tower 30 by means of pump 35 in line 36. A part of the solution is simultaneously passed through line 37 to classifier tower 40. Slide valve 38 in line 37 is adjusted to direct an upward flow of the solution in towers 30 and 40 in order to produce a combined oil plus solution hydrostatic head in tower 30 slightly greater than the hydrostatic head produced by the column of solution in tower 40. Hydrosol is then introduced to nozzle 29 under sufficient pressure to form particles of hydrosol of the approximate desired size which fall through the supernatant oil layer as spheroidal particles. The particles pass through interface 31 into the ammonia solution and set to spheroidal hydrogel particles as they flow downward under the influence of gravity. The hydrogel particles pass to base of the tower where they are picked up by the stream of setting solution flowing in lines 36 and 37. The particles are carried at a constant velocity into classifier 40 and through nozzle 41 by the stream of setting solution to a level somewhat above the bottom of the classifier. At the level of nozzle 41 the cross sectional area of a horizontal section of the tower is greater than the cross sectional area of the stream flowing from the nozzle.

The linear velocity of the stream becomes progressively lower as the liquid rises in classifier 40. At no level in the classifier is the linear velocity of the stream sufficient to overcome the normal settling velocity, that is, Stokes' law terminal velocity, of the oversize spheroidal particles. Hence, these particles settle to a level below nozzle 41 and are withdrawn from classifier 40 as a slurry through lines 45 and 46 by means of pump 47. As the stream rises in the classifier the linear velocity progressively decreases to a value equal to the normal settling velocity of the intermediate size spheroidal particles. Substantial equilibrium of the settling tendency of these desired size range particles versus the tendency to be carried in suspension results, and the desired size range particles tend to segregate. These particles collect in tray 48. If desired, tray 48 may take the form of an annular trough located around the periphery of the inner surface of the classifier. Such an annular trough may be slightly inclined in order to provide free flow of the slurried particles to drawoff line 49 or the annular trough may be provided with a multiplicity of drawoff lines which are manifolded to main drawoff line 49.

The slurry of particles passes by gravity flow through line 49 to settler 50 whence the settled hydrogel spheroidal particles pass via line 51 to drier 52. If desired, the hydrogel beads may be subjected to a washing step (not shown in the drawing) before being dried. The hydrogel spheres are dried at a temperature of about 212° F. in drier 52, and the dried bead-form gel particles are passed through product line 53 to the heat treatment step (not shown) where they are subjected to a temperature within the range of from about 800° F. to about 950° F. to decompose residual adsorbed acetates and to activate the particles.

The stream of solution containing undersize hydrogel particles continues in upward flow in tower 40 and overflows through line 60 which connects with line 46 and the combined streams from lines 45 and 60 are passed to a rotary vacuum filter 61 of the Oliver type, preferably equipped with a repulper, for separation of the hydrogel from the setting solution. The setting solution is recycled from filter 61 to line 36 through lines 62 and 63. Setting solution from settler 50 is recycled through line 64 which joins line 63. When the setting agent becomes depleted with respect to dissolved ammonia, make-up ammonia may be added directly to the aqueous layer in tower 30 through line 65 either as ammonia gas or as concentrated ammonium hydroxide. Make-up setting agent may be introduced to line 36 through line 66.

Hydrogel which is recovered from filter 61 passes by gravity to mixing tank 70 which is equipped with mixing device 71. An aqueous solution of acetic acid of from 1 to 5 per cent concentration from line 72 is added to mixing tank 70 at a temperature with the range of from about 150° F. to about 200° F. Thorough mixing of hydrogel with the hot acetic acid solution results in repeptization of the hydrogel to hydrosol which may be recycled through lines 73 and 74 to cooler 75 wherein the temperature is lowered to 80° F. or less. The cooled hydrosol is passed from cooler 75 through line 76 to line 27. If desired, the acetic acid containing any non-peptized hydrogel may be recycled to line 13 through lines 73, 77, and 11, and thereby furnish make-up acid for the peptizing step of the process.

Various modifications may be made in the apparatus and method of carrying out my process without departing from the spirit of the invention. For example, the flow of peptizing agent in tower 10 may be directed downward instead of upward or the flow may be directed through a horizontal tank type reactor. Instead of using a single vessel of conical shape to separate the hydrogel spheres, use may be made of a classification zone consisting of a series of two or more vessels of such shape and size that a liquid suspension of hydrogel particles will deposit oversize spheres in the first vessel and allow fines and small spheres to be carried out of the last vessel of the series. By means of a series of such vessels any number of intermediate sized fractions may be separated as settled segregated slurries of spheroidal particles from sections of the stream of liquid suspension where the velocity of the stream is intermediate the initial velocity as the stream enters the first tower and the final overflow velocity from the last tower. These vessels need not be cone-shaped. For example, the desired decrease in stream velocity as the suspending liquid rises in the classifier may be made intermittent instead of continuous by separating successive uniform increases in diameter of the classifier by sections, the walls of which are perpendicular, that is, by alternating inverted conical frustrums with cylindrical sections.

The process is also applicable to the classification of bead-form hydrogel particles of oxides other than alumina. Thus, silica hydrogel, silica-alumina hydrogel, and hydrogels of other mixed oxides may be classified by my process. Oversize and undersize hydrogel particles may be segregated, thus saving the expense of large scale equipment for drying, screening, and handling the gel product. The process is particularly advantageous for separating undersize and oversize beads of oxides, the hydrogels of which are susceptible to repeptization in the hydrogel state but which as gels are difficult of or impossible of repeptization.

The process is applicable to the classification of spheroidal gel particles which can be formed from hydrosols of normally solid inorganic oxides, more specifically, solid amphoteric oxides. Such hydrosols may be formed by building up colloidal particles from ions, as, for example, the formation of silicic acid sol by the addition of a solution of sodium silicate to a mineral acid. The hydrosol of the inorganic oxide may also be formed by breaking down an oxide or a gel structure thereof to colloidal size by means of peptization, as, for example, by peptizing hydrated alumina by means of acetic acid. The term "inherent capacity of the hydrosol to set to a hydrogel" as used in the specification and claims refers to that property of the hydrosol which is manifested by a capacity to change from a relatively low viscosity to a relatively high viscosity either by the influence of time and/or temperature or by the addition of an agent to the hydrosol which causes a change in the hydrogen ion concentration in the hydrosol.

In the case of silica-alumina beads containing predominantly silica gel the offsize fractions may be recovered by pulping or crushing the beads of hydrogel and by treating the resulting slurry with an aqueous caustic solution such as sodium hydroxide. This results in a solution of sodium silicate and sodium aluminate which may be reconverted into beads by mixing continuously with sulfuric acid in the correct proportion and injecting into the oil layer of the hydrogelation process. This recovery before drying of the hydrogel is particularly advantageous because the freshly formed silica hydrogel is readily soluble in this state while it becomes less readily soluble after drying and after being activated by heating to a high temperature.

I claim:

1. In a continuous process for the manufacture of inorganic oxide spheroidal particles of a desired size range having adsorbent and catalytic properties the steps which comprise (1) continuously forming a hydrosol of at least one normally solid inorganic oxide characterized by an inherent capacity to set to a hydrogel, (2) continuously introducing said hydrosol into a body of a liquid in which said hydrosol is immiscible to form a multiplicity of spheroidal particles of different sizes, (3) continuously converting said particles of hydrosol to particles of hydrogel, (4) continuously classifying the hydrogel particles of step 3 to separate undersize and oversize particles of hydrogel from hydrogel particles of the size desired, (5) continuously reconverting the undersize and oversize hydrogel particles of step 4 to hydrosol, (6) continuously recycling the hydrosol of step 5 to step 2, and (7) drying the hydrogel particles of the desired size recovered from step 4.

2. In a continuous process for the manufacture of spheroidal particles of alumina of a desired size range having adsorbent and catalytic properties the steps which comprise (1) continuously forming a hydrosol of alumina, (2) continuously introducing said hydrosol into a body of a liquid with which said hydrosol is immiscible to form a multiplicity of spheroidal particles of different sizes, (3) continuously converting the spheroidal particles of hydrosol of step 2 to spheroidal particles of hydrogel, (4) continuously separating the undersize and oversize spheroidal particles of hydrogel of step 3 from the spheroidal particles of hydrogel of the desired size range, (5) continuously reconverting to hydrosol state the undersize and oversize spheroidal particles of step 4, (6) recycling the hydrosol of step 5 to step 2, and (7) continuously drying the desired size range spheroidal particles of hydrogel recovered from step 4.

3. The process as described in claim 2 wherein separation of offsize spheroidal particles of hydrogel from spheroidal hydrogel particles of the desired size range is accomplished by continuously introducing at a constant velocity a stream consisting of a liquid supsension of the said particles into the lower part of a tower, the cross sectional areas of horizontal sections of which tower at the level of introduction of said stream and at levels above the point of introduction of said stream are successively greater than the cross sectional area of said stream at the level of introduction of said stream, continuously passing said stream upward in said tower to effect a reduction in the linear velocity of said stream at said levels of greater cross sectional area whereby oversize particles and desirable size particles tend to settle from said suspension and concentrate in successive separate layers and undersize particles are carried overhead in suspension in said liquid stream, and continuously trapping out from said separate layers separate streams of liquid slurries of said oversize particles and the desired size range particles.

4. The process as described in claim 2 wherein the undersize and oversize hydrogel particles are reconverted to a hydrosol of alumina by treating said particles with an aqueous solution containing from about 3 per cent to about 10 per cent by weight of acetic acid.

5. The process as described in claim 2 wherein separation of offsize spheroidal hydrogel particles from the desired size range of spheroidal hydrogel particles is accomplished by continuously intoducing at constant linear velocity a stream consisting of a liquid suspension of said particles at a level above the apex of an inverted cone-shaped tower, continuously passing said stream upwardly in said tower at a constantly decreasing linear velocity in said tower whereby the oversize and desired size range particles of said suspension tend to settle and form separate layers of said oversize and desired size range particles, continuously passing said stream containing undersize particles suspended therein from said tower, and continuously removing from said layers separate liquid slurries of said oversize and said desired size range hydrogel particles.

6. In a continuous process for the manufacture of inorganic oxide spheroidal particles of a desired size range having adsorbent and catalytic properties the steps which comprise (1) continuously forming a hydrosol of at least one normally solid inorganic oxide characterized by an inherent capacity to set to a hydrogel, (2) continuously introducing said hydrosol into a body of a liquid in which said hydrosol is immiscible to form a multiplicity of spheroidal particles of different sizes, (3) continuously converting said particles of hydrosol to particles of hydrogel, (4) continuously passing a liquid suspension of the hydrogel particles upwardly through a classification zone consisting of at least one tower wherein the velocity of liquid progressively decreases, (5) regulating the discharge liquid velocity from said classification zone so that undersize hydrogel particles are discharged overhead therefrom, (6) continuously withdrawing from the high liquid velocity section of the classification zone a slurry of oversize hydrogel particles, (7) continuously withdrawing from said classification zone at at least one section of intermediate velocity hydrogel particles of the desired size range as a slurry of settled, segregated particles, (8) continuously reconverting the undersize particles and oversize particles to hydrosol, (9) continuously recycling the hydrosol formed in step 8 to step 2, and (10) recovering and drying the desired size range particles of step 7 of the process.

7. In a continuous process for the manufacture of inorganic oxide spheroidal particles of a desired size range having adsorbent and catalytic properties the steps which comprise (1) continuously forming a hydrosol of at least one normally solid inorganic oxide characterized by an inherent capacity to form a gellable hydrosol, the hydrogel of which is reconvertible to the hydrosol state, (2) continuously introducing said hydrosol into a body of a liquid with which said hydrosol is immiscible to form a multiplicity of spheroidal particles of hydrosol, (3) continuously suspending said hydrosol particles in a gelation medium and converting said particles to suspended spheroidal particles of hydrogel, (4) introducing a liquid suspension of the hydrogel at a point above the bottom of a tower of a shape such that the cross sectional areas of horizontal sections of said tower at the level of the point of introduction and at at least one higher level are progressively greater than the cross-sectional area of the liquid stream at said point of introduction whereby oversize particles are caused to settle and segregate below said point of introduction of said stream, (5) continuously passing said stream of suspended particles upwardly in said tower whereby the linear velocity of said stream is progressively decreased, hydrogel particles of the desired size range are caused to settle and segregate at a level above said point of introduction of said stream and undersize hydrogel particles are carried upward in suspension and from said tower, (6) continuously passing as a liquid slurry the oversize hydrogel particles of step 4 and the suspension of undersize particles of step 5 to and through a hydrogel recovery zone for the separation of hydrogel from the suspending liquid, (7) recycling the liquid separated in step 6 to step 3, (8) continuously converting the hydrogel recovered in step 7 to the corresponding hydrosol of said inorganic oxide, (9) passing the segregated desired size range of hydrogel particles of step 5 as a slurry from said tower to a settling zone, (10) recycling the liquid separated in step 9 to step 3, and (11) recovering and drying the separated hydrogel particles of step 9.

HENRY TRUEHEART BROWN.

REFERENCES CITED

The following references are of record in the file of this patent:

UNITED STATES PATENTS

| Number | Name | Date |
|---|---|---|
| 1,281,371 | Hitchcock | Oct. 15, 1918 |
| 1,319,771 | Hitchcock | Oct. 28, 1919 |
| 2,203,825 | Komarewsky | June 11, 1940 |
| 2,371,087 | Webb et al. | Mar. 6, 1945 |
| 2,371,237 | Heard et al. | Mar. 13, 1945 |
| 2,384,946 | Marisic | Sept. 18, 1945 |
| 2,387,596 | Marisic | Oct. 23, 1945 |